United States Patent [19]

Derrick et al.

[11] Patent Number: 5,412,544
[45] Date of Patent: May 2, 1995

[54] METHOD OF ILLUMINATING AND PROVIDING EMERGENCY EGRESS GUIDANCE FOR HAZARDOUS AREAS

[75] Inventors: Donald E. Derrick, Hanover, N.H.; Hollis A. Harris, Sonoma, Calif.; Robert H. Marion, Etna; William A. Tower, Canaan, both of N.H.; L. Christopher Towle, Maulden, England

[73] Assignees: Loctite Luminescent Systems, Inc., Lebanon, N.H.; The MTL Instruments Group plc, Bedfordshire, England

[21] Appl. No.: 111,247

[22] Filed: Aug. 24, 1993

Related U.S. Application Data

[63] Continuation-in-part of Ser. No. 752,752, Aug. 30, 1991, abandoned.

[51] Int. Cl.⁶ .................... F21V 25/00; F21S 5/00
[52] U.S. Cl. ........................... 362/84; 362/310
[58] Field of Search ............ 362/84, 34, 186, 310, 362/267; 313/512; 40/544, 545

[56] References Cited

U.S. PATENT DOCUMENTS

| | | | |
|---|---|---|---|
| 3,137,804 | 6/1964 | Rubens | 313/312 |
| 3,317,722 | 5/1967 | Whitney | 313/512 |
| 4,104,555 | 8/1978 | Fleming | 313/512 |
| 4,138,620 | 2/1979 | Dickson | 313/1 |
| 4,466,208 | 8/1984 | Logan, Jr. et al. | 40/544 |
| 4,482,841 | 11/1984 | Tiku et al. | 313/503 |
| 4,527,096 | 7/1985 | Kindlmann | 315/169.3 |
| 4,859,361 | 8/1989 | Reilly et al. | 252/301.6 S |
| 5,253,150 | 10/1993 | Vanni | 362/183 |
| 5,276,382 | 1/1994 | Stocker et al. | 313/506 |
| 5,293,098 | 3/1994 | Brownell | 315/169.3 |
| 5,317,488 | 5/1994 | Penrod | 362/84 |

FOREIGN PATENT DOCUMENTS

| | | | |
|---|---|---|---|
| 336601 | 10/1989 | European Pat. Off. | F21P 1/02 |
| 335795 | 5/1972 | U.S.S.R. | H05B 33/26 |
| WO92/14092 | 8/1992 | WIPO | F21P 1/02 |

OTHER PUBLICATIONS

L. C. Towle, "Intrinsic Safety–Its Widening Horizons," Measurement Technology Ltd., TP1099, Mar. 1991.
"Intrinsic Safety Principles and Practice," MTL, PS007-3.
"LifeLine ™ Floor-Proximity Lighting System Planning Guide," Loctite Luminescent Systems, Inc. © 1989.
"When Disaster Strikes, You Can Count on Our Solid–State Escape Path Lighting," Loctite Luminescent Systems, Inc., © 1988.
Loctite Luminescent Systems, Inc. Product Bulletin 90277, © 1989.
Loctite Luminescent Systems, Inc. Product Bulletin 90275, © 1989.
Loctite Luminescent Systems, Inc. Product Bulletin 90267, © 1989.
Loctite Luminescent Systems, Inc. Product Bulletin 90273, © 1989.
Loctite Luminescent Systems, Inc. Product Bulletin 90268, © 1989.
Loctite Luminescent Systems, Inc. Product Bulletin 90279, © 1989.
"The Design Guide to Electroluminescent Lighting," Luminescent Systems, Inc.

(List continued on next page.)

Primary Examiner—Ira S. Lazarus
Assistant Examiner—L. Heyman
Attorney, Agent, or Firm—Edward K. Welch, II; Eugene F. Miller

[57] ABSTRACT

A method for illuminating explosive, flammable, and other hazardous environments. The method employs electroluminescent lights heaving controlled dielectric strength and capacitance, which when matched with the low current and voltage from an intrinsically safe power supply, and the controlled capacitance of each lighting circuit, produces an emergency lighting system which is both safe and effective.

24 Claims, No Drawings

OTHER PUBLICATIONS

Phil Bishop, "Intrinsically Safe Electroluminescent Low Level Emergency Escape Path Lighting," Offshore Oil International, May 1991.

"Electrical Apparatus for Explosive Gas Atmospheres, Part 11: Construction and test of intrinsically-safe and associated apparatus," International Electrotechnical Commission IEC Standard, Publication 79-11, Second Edition, © 1984.

Cenelec, "TE 31: Electrical Apparatus for Explosive Atmospheres," and SC 31-3: Intrinsically Safe Apparatus and Systems 'i', Draft 3, Dec. 1990.

MTL Application Note AN9003-5, "A User's Guide to Intrinsic Safety," Measurement Technology Ltd., © Mar. 1989.

METHOD OF ILLUMINATING AND PROVIDING EMERGENCY EGRESS GUIDANCE FOR HAZARDOUS AREAS

RELATED APPLICATION

This is a continuation-in-part of prior U.S. patent application Ser. No. 07/752,752, filed 30 Aug. 1991, abandoned.

INTRODUCTION

This invention relates to a method for illuminating and, in particular, marking an exit path in explosive, flammable, and other hazardous environments. Generally, the method comprises the steps of installing electroluminescent lights or an electroluminescent lighting system in the environment, connecting said electroluminescent lights or electroluminescent lighting system to a power supply, and providing power to said electroluminescent lights or electroluminescent lighting system so as to cause its illumination. The electroluminescent lights and electroluminescent lighting systems used in the method of the present invention are characterized as being capable of operation without generating spark or thermal effect sufficient to cause ignition of the flammable or explosive atmosphere.

Generally, the electroluminescent lighting system combines a power source capable of providing AC power of controlled voltage and current to a system of two or more parallel electroluminescent lighting circuits of controlled capacitance, providing both an assurance of spark-free, low temperature operation and adequate brightness for emergency use.

BACKGROUND OF THE INVENTION

Providing adequate illumination in hazardous work areas, particularly explosive or flammable work areas, has been difficult to accomplish with adequate safety. Most lighting systems utilize circuitry with an inherent spark potential, operate at high temperature, or both. In addition, large area or long-length lighting systems commonly require power inputs which create the hazard of fire or explosion in these unique environments. This is true for both ambient lighting and emergency lighting. While daylight operation can be an adequate answer to the former, emergency lighting must operate at all times and in adverse atmospheres (smoke, fog, etc.), and hence creates special difficulties.

Certain metering and other devices for use in hazardous areas have used what is commonly known as "intrinsically safe" ("IS") circuitry and equipment, where low power input is adequate, such as about one watt or less. IS systems call for the use of low capacitance, current and voltage for safety reasons. Components and circuitry of this type are provided, for example, by the MTL Group of Luton, England, but such systems have not been favored for use in lighting systems as acceptable light sources were not available.

EL lights have been used for exit path marking systems, such as those provided by Loctite Luminescent Systems, Inc., Lebanon, N.H., U.S.A. Generally, such EL lights and EL systems require the use of high capacitance and voltage in order to provide adequate brightness and sufficient illumination of an area for effectiveness. Thus, such EL lights and EL systems have not been used in, nor were they believed to be suitable for, hazardous environments where the potential for explosions due to electrical sparks or high temperatures has existed.

SUMMARY OF THE INVENTION

According to the invention herein, it has been found that a specific construction and arrangement of EL lighting circuits can be used in conjunction with a carefully constructed and controlled IS power source to make available an emergency lighting system capable of use in flammable, explosive or like hazardous areas.

Specifically, the method of the present invention contemplates the installation and use of an IS emergency egress electroluminescent lighting system ("EL System") comprising:

(a) two or more electroluminescent lighting circuits ("EL Circuits") each comprising one or more electroluminescent lights ("EL Lights") and cables connecting said EL Lights to a power supply, each of said EL Circuits having a total circuit capacitance not exceeding about 1000 nanofarads, and (b) optionally, an IS power supply providing AC power at a maximum current of about 200 milliamps and a maximum voltage of about 50 volts peak to each of said two or more lighting circuits. Obviously, the power supply may or may not comprise the EL System, but is preferably part of the EL System.

The operative or illuminating portion of the EL Lights generally comprise, in sequence, a back electrode having a lead attached thereto, an interlayer comprising an electroluminescent phosphor, and a transparent electrode having a busbar attached thereto, and a lead attached to said busbar. This portion is typically encased within a substantially moisture impermeable casing. Of critical importance in the practice of the method of the present invention is that the EL Lights are further characterized in that their capacitance, in operation, is from about 2 to about 10 nanofarads per square inch, and their brightness is at least about one footlambert.

The invention also contemplates flammable or explosive environments in which EL Lights and EL Systems have been installed.

DESCRIPTION OF THE INVENTION

The present invention is directed to a method for illuminating and, in particular, marking an exit path for emergency egress in flammable or explosive environments. Generally, the method comprises the steps of installing EL Lights or EL Systems in a potentially flammable or explosive environment, connecting said EL Lights or EL Systems to a power source, and providing power to said EL Lights or EL Systems so as to illuminate the lighting elements.

The EL Lights and EL Systems useful in the practice of the present invention are those which can be utilized without producing a spark or sufficient thermal effect to cause ignition of the flammable or explosive atmosphere. This property is characteristic of electronic and other apparatus and devices which are, by industry and governmental standards, classified as intrinsically safe ("IS").

Where an EL System is employed, the EL System typically comprises two or more EL Circuits, each comprising one or more EL Lights and cables connecting the EL Lights to the power supply. The EL System may also comprise the power supply itself. The power input to the lighting circuits herein is provided by an IS power supply. The IS power supply contains an interface consisting of a number of discrete devices such as shunt diode safety barriers or equivalent means of isolation. The shunt diode safety barriers are composed of a combination of resistors and Zener or forward connected diodes. The above described IS power supply can be located in a non-hazardous area or, if suitably enclosed or otherwise protected, can be located within the hazardous area. The key is its capability to provide AC power of controlled amperage and voltage which can be matched with the requirements of the EL Circuits. While the voltage input should be controlled to a peak voltage of about 50 V, in many environments a commonly accepted preference is a peak voltage of about 42.5 V. Amperage should be sufficient to provide power to each of the lighting circuits, but is maintained at a maximum of 200 milliamps per circuit, and preferably a maximum of approximately 130 milliamps per circuit.

The frequency of the AC input may vary, but must be sufficient to produce the minimum brightness required in the EL Lights, discussed below. Generally, at least about 400 Hertz will be used, preferably at least about 600 Hertz, and most preferably at least about 800 Hertz. The upper limit is not critical, but typically will not exceed about 2500 Hertz.

A plurality of EL Circuits is required in order to provide adequate lighting capacity while maintaining controlled system capacitance. While there is no theoretical limit to the number of EL Circuits which can be utilized, system safety and efficiency is best provided with a maximum of 20 such EL Circuits, and preferably not more than about 10 of such EL Circuits. Each EL Circuit, however, must have a maximum circuit capacitance of not greater than 1,000 nanofarads when the EL Lights are in the lit condition, preferably about 500 nanofarads, and most preferably a maximum of about 250 nanofarads per circuit.

While cabling, connectors and other minor components must be accounted for, the bulk of the EL Circuit capacitance is found in the EL Lights. As the EL Lights may be considered light emitting capacitors, their construction is important to the successful operation of the system described herein. For a detailed review of the general parameters of EL Light construction, reference is made to U.S. Pat. Nos. 4,104,555 and 4,902,567, the details of which are incorporated herein by reference.

As shown in the above and other references, the EL Light is composed of a plurality of layers. A light emitting dielectric layer is placed between two conductive layers, one of which is light transmissive. The first and non-light transmissible layer typically is a thin aluminum, silver or other highly conductive metallic film or foil, whereas the second and light transparent conducting layer typically is composed of a thin, transparent layer of indium tin oxide or like material.

The light emitting dielectric layer commonly is composed of several sublayers, including at least one insulating sublayer of high dielectric constant, such as barium titanate in a high dielectric constant resin, such as a cyanoethylated polymer. Also present is a sublayer containing the light emitting substance, typically a zinc sulphide phosphor. The phosphor typically is contained within an organic binder, such as cyanoethylated polymers, as mentioned above.

Each of the conducting layers also has a lead attached thereto, for the purpose of power input to the EL Light. The light transmissive conducting layer also commonly is supplemented with a busbar of highly conductive material, such as a silver paint. The busbar generally is placed along at least a portion of the periphery of the layer, but it may be located elsewhere on the conductive layer, if the user desires.

The entire EL Light thereafter is encased within a substantially moisture impermeable casing, such as by sealing with a transparent fluoropolymer or other barrier film. The preferred choice is the fluoropolymer film sold under the trademark "Aclar" by Allied Chemical Co.

EL Lights constructed as described herein will have a capacitance of at least two, preferably at least three, and most preferably at least four, nanofarads per square inch, and will exhibit a brightness of at least one foot-lambert, preferably at least about two, and most preferably at least four, footlamberts when subjected to an AC input of a maximum of 50 volts peak, and a frequency of between 400 and 1500 Hertz.

While the low capacitance desired for intrinsic safety is obtained with thicker dielectric layers and lower dielectric constant, lamp brightness is reduced when these are used. Accordingly, each EL Circuit must be designed to meet the limits described herein in order to provide the required minimum brightness and lit area needed for the workability of the EL System, while preserving appropriate voltage, amperage and capacitance needed to meet the required safety limits.

In order to provide the necessary illuminated surface, typically a minimum of about 20 square inches of EL Light area per circuit, and preferably 30 square inches, must be provided. Typically elongated electroluminescent lamps of width less than ½ inch are used in order to form an illuminated path necessary for emergency guidance. EL Lights have been found to provide the highly desirable benefit of high visibility in smoke, fog and other adverse environments, even at relatively low brightness levels. The brightness, however, should be at least one footlambert, preferably two footlamberts, and most preferably four footlamberts, in order to provide clear visibility, particularly over extended periods of usage which may cause partial loss of brightness in the system.

To accomplish these requirements, the total effective capacitance of the EL Lights should be between about two and about ten nanofarads per square inch. For maximum benefits and utility, this capacitance preferably is between three and eight, and most preferably between four and seven, nanofarads per square inch. Two or more EL Lights may be combined within each EL Circuit provided their total capacitance, when aggregated with the capacitance of the cables, connectors and any other components of the circuit, does not exceed the maximum allowable capacitance for the total EL Circuit, defined above.

The present invention has been described in detail, including the preferred embodiments thereof. However, it will be appreciated that those skilled in the art, upon consideration of the present disclosure, may make modifications and/or improvements of the invention and still be within the scope and spirit of this invention as set forth in the following claims.

We claim:

1. A method of illuminating an environment which is potentially explosive and flammable without generating spark or thermal effect sufficient to cause ignition of a flammable or explosive atmosphere, said method comprising the steps of installing at least one electroluminescent light ("EL Light") in said environment, connecting said EL Light to a power supply, and providing power to said EL Light so as to cause its illumination wherein the EL Light is characterized in that its capacitance, in operation, is from about two to about ten nanofarads per square inch and its brightness is at least about one footlambert when subjected to an alternating current with a peak voltage of at most about 50 volts and a frequency of between 400 and 1500 Hertz and when drawing a maximum amperage of about 200 milliamps.

2. The method of claim 1 wherein the capacitance of said EL Light is at least about three nanofarads per square inch and the peak voltage is at most about 42.5 volts.

3. The method of claim 1 wherein the capacitance of said EL Light is at least about four nanofarads per square inch.

4. The method of claim 1 wherein the brightness is at least two footlamberts.

5. The method of claim 1 wherein the brightness is at least four footlamberts.

6. The method of claim 1 wherein the EL Light is a component of an electroluminescent lighting circuit ("EL Circuit") comprising at least one EL Light and cables connecting the EL Light to a power supply, said EL Circuit having a total capacitance not exceeding about 1000 nanofarads and drawing a maximum amperage of about 200 miliamps.

7. A method of illuminating an environment which is potentially explosive and flammable without generating spark or thermal effect sufficient to cause ignition of a flammable or explosive atmosphere, said method comprising the steps of installing an electroluminescent lighting system ("EL System") in said environment, connecting said EL System to a power source, and providing power to said EL System so as to illuminate the environment wherein the EL System comprises two or more electroluminescent lighting circuits ("EL Circuits"), each comprising (a) one or more electroluminescent lights ("EL Lights") which are characterized in that their capacitance, in operation, is from about two to about ten nanofarads per square inch and its brightness is at least about one footlambert when subjected to an alternating current with a peak voltage of at most about 50 volts and a frequency of between 400 and 1500 Hertz and (b) cables connecting the EL Lights to the power supply, each of said EL Circuits having a total capacitance not exceeding about 1000 nanofarads and drawing a maximum amperage of about 200 milliamps.

8. The method of claim 7 wherein the EL System further comprises a power supply providing AC power at a maximum current of about 200 milliamps with a frequency of between 400 and 1500 Hertz and a maximum peak voltage of about 50 volts peak to each of the EL Circuits.

9. The method of claim 8 wherein the power supply is located within the environment and is incapable of producing a spark or sufficient thermal effect to cause the ignition of the explosive or flammable atmosphere.

10. The method of claim 7 wherein the total capacitance of each EL Circuit does not exceed about 500 nanofarads.

11. The method of claim 7 wherein the total capacitance of each EL Circuit does not exceed about 250 nanofarads.

12. The method of claim 7 wherein the total capacitance of each EL Circuit does not exceed about 250 nanofarads and the voltage of the current is at most about 42.5 volts.

13. The method of claim 7 wherein the brightness is at least two footlamberts.

14. The method of claim 7 wherein the brightness is at least four footlamberts.

15. The method of claim 7 wherein the power being supplied to each of the EL Circuits is alternating current having a frequency of at least about 400 Hertz.

16. The method of claim 7 wherein the power being supplied to each of the EL Circuits is alternating current having a frequency of at least about 600 Hertz.

17. The method of claim 7 wherein the capacitance of the EL Lights is from about four to about seven nanofarads per square inch.

18. The method of claim 7 wherein the current in each EL Circuit is not greater than about 130 milliamps.

19. The method of claim 7 wherein the illuminated surface area of each EL Circuit is at least about 20 square inches.

20. An explosive or flammable environment in which is located at least one electroluminescent light ("EL Light") which is capable of operating without generating spark or thermal effect sufficient to cause ignition of a flammable or explosive atmosphere said EL Light characterized in that its capacitance, in operation, is from about two to about ten nanofarads per square inch and its brightness is at least about one footlambert when subjected to an alternating current with a peak voltage of at most about 50 volts and a frequency of between 400 and 1500 Hertz and when drawing a maximum amperage of about 200 milliamps for providing illumination and emergency egress guidance.

21. The explosive or flammable environment of claim 20 wherein the EL Light is a component of an electroluminescent lighting circuit ("EL Circuit") comprising at least one EL Light and cables connecting the EL Light to a power supply, said EL Circuit having a total capacitance not exceeding about 1000 nanofarads and drawing a maximum amperage of about 200 miliamps.

22. An explosive or flammable environment in which is located an electroluminescent lighting system ("EL System") which is capable of operating without generating spark or thermal effect sufficient to cause ignition of a flammable or explosive atmosphere, said EL System comprising two or more electroluminescent lighting circuits ("EL Circuits"), each comprising (a) one or more electroluminescent lights ("EL Lights") which are characterized in that their capacitance, in operation, is from about two to about ten nanofarads per square inch and its brightness is at least about one footlambert when subjected to an alternating current with a peak voltage of at most about 50 volts and a frequency of between 400 and 1500 Hertz and (b) cables connecting the EL Lights to the power supply, each of said EL Circuits having a total capacitance not exceeding about 1000 nanofarads and drawing a maximum amperage of about 200 milliamps for providing illumination and emergency egress guidance.

23. The explosive or flammable environment of claim 22 wherein the EL Light, during operation, has a capacitance of from about three to about seven nanofarads per square inch and the illumination is achieved with an alternating current having a peak voltage of about 42.5 volts and a frequency of at least about 600 Hertz while drawing a maximum amperage of 130 milliamps.

24. The explosive or flammable environment of claim 22 wherein the EL System further comprises a power supply providing AC power at a maximum current of about 200 milliamps with a frequency of between 400 and 1500 Hertz and a maximum peak voltage of about 50 volts peak to each of two or more EL Lights through connecting cables, the power supply and cables being incapable of generating any spark or thermal effect upon normal use which would ignite the explosive or flammable environment.

* * * * *